Aug. 6, 1968      J. D. BROOKS      3,395,720

MAGNETOHYDRODYNAMIC-VORTEX STREAM TRANSDUCER

Filed Feb. 24, 1965

INVENTOR.
JOHN D. BROOKS
BY V. C. MULLER
ATTORNEY.

United States Patent Office 3,395,720
Patented Aug. 6, 1968

3,395,720
MAGNETOHYDRODYNAMIC-VORTEX STREAM TRANSDUCER
John D. Brooks, Alhambra, Calif., assignor to the United States of America as represented by the Secretary of the Navy
Filed Feb. 24, 1965, Ser. No. 435,096
4 Claims. (Cl. 137—81.5)

ABSTRACT OF THE DISCLOSURE

A transducer for converting an electrical signal to a fluid vortex signal comprising a thin, disc-shaped chamber, adapted to receive an electrically conductive fluid at its outer periphery, and having a central fluid outlet in one of its lateral walls. A pair of annular electrode plates are mounted in the lateral walls of the chamber in confronting relationship to each other, and adjacent the outer periphery of the chamber, to provide an electric force field therebetween. Behind the electrode plates in each wall is a circular row of radially oriented bar magnets poled to generate a radial magnetic field. The crossed magnetic and electric force fields cause the conductive fluid to leave the outlet as a vortex stream having in intensity and angular direction of motion in accordance with the signal applied across the annular electrodes.

---

Figure 1:
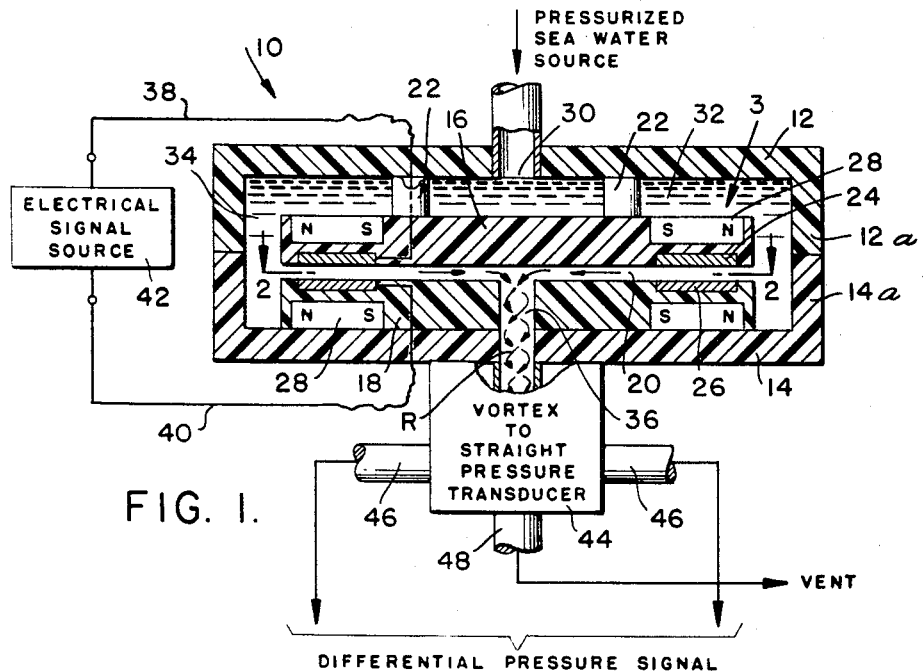

The invention described herein may be manufactured and used by or for the Government of the United States of America for governmental purposes without the payment of any royalties thereon or therefor.

This invention relates to a tranducer apparatus for modulating the flow of a stream of fluid in response to an electrical signal. Transducers of this kind are used to couple a signal from electrical apparatus to a pure fluid control apparatus. The present invention relates more particularly to improvements which increase the efficiency of the transducer apparatus and extend the scope of its application beyond that of prior art apparatuses.

Pure fluid control apparatuses are a comparatively recent addition to the control art. Because they have no moving parts, are made of inexpensive forms of construction, and are rugged and durable, they find increasing use in place of apparatuses formerly of electronic and electromechanical constructions. However, while pure fluid units have a relative advantage in performing certain kinds of functions, electrical units have a relative advantage in performing others. For example, a fluid control unit is most effective where it can be incorporated into a system as a self-contained unit in close proximity to both the control stimuli to which it is responsive, and to the mechanical output which it controls. Where transmission of signals over long distances or through limited communication passages is required, this is still best performed by electrical circuits. Also, in certain instances sening the control stimuli must necessarily be done by electrical or electronic devices, such as in radar and underwater sound detection systems. Thus in many instances fluid control units are employed in systems which incorporate both electrical and fluid units.

The range of application of fluid controls includes most of the field of control engineering previously performed by totally electronic or electromechanical constructions. However, despite their simplicity and potential saving in cost of manufacture, pure fluid controls have not found a scope of use as extensive as the advantages indicate. It is believed that reluctance to make more widespread use of fluid control units stems to a large degree from disadvantages, weaknesses, and limitations of the prior art device for coupling a signal from an electrical apparatus to a pure fluid control apparatus.

While there may be other disadvantages, weaknesses and limitations, among the principle ones are the fact that the prior art devices required an expensive liquid metal for their "working fluid" or that they required expensive appurtenant equipment. Also, the prior art devices are relatively insensitive to small signal change in input signal, in contrast to the good dynamic responses achievable by electrical and electronic circuits and by pure fluid control units, per se.

An example of prior art devices requiring an expensive working fluid is that disclosed in the inventor's co-pending application Ser. No. 361,623, filed Apr. 20, 1964, and entitled "Signal Summing Point Device for Hybrid Fluid and Electronic Controls." Here, the principles of magnetohydrodynamic force and a bifurcated chamber are employed to modulate a stream of conductive fluid. This device does not operate as effectively with a non-metallic conductive liquid working fluid, as it does with a liquid metal working fluid. This is because the magnetohydrodynamic force which may be imparted to liquid metals by given power level of signal are several orders of magnitude greater than those imparted to non-metallic conductive liquids. Accordingly, this device is generally limited in its application to systems in which a source of pressurized liquid metal is conveniently available, such as in liquid sodium reactors. Another principle employed in prior art signal conversion devices, illustrated by U.S. Patent 3,071,154 to N. A. Cargill et al., entitled "Electro-Pneumatic Fluid Amplifier," is to ionize a pneumatic stream, and then employ electrostatic force to modulate the ionized stream. The ionization equipment is costly, and requires a special power source of its own.

Limitation in the sensitivity of these types of devices are due to the inherently weak levels of forces which may be imparted to moving fluids by magnetohydrodynamic or electrostatic action.

An obvious use for an electrical to fluid signal converter that would effectively operate with a non-metallic conductive liquid as its working fluid, would be the application of fluid control units to underwater torpedoes. Here the normally saline ambient ocean water is readily available for induction for use in the torpedo, as has been done in connection with salt water batteries.

Recognizing the foregoing disadvantages, weaknesses, and limitations, and seeking to correct same, the objects of the present invention include provision of:

(1) A novel transducer apparatus for modulating the flow of a stream of fluid in response to an electrical signal, which provides a greater transducing efficiency than heretofore available in the prior art.

(2) An improved apparatus for converting an electrical signal to a fluid signal, which is more effective for operation with non-metallic liquid working fluids than prior art devices.

(3) An improved apparatus for converting an electrical signal to a fluid signal which does not require expensive appurtenant equipment.

Figure 2:
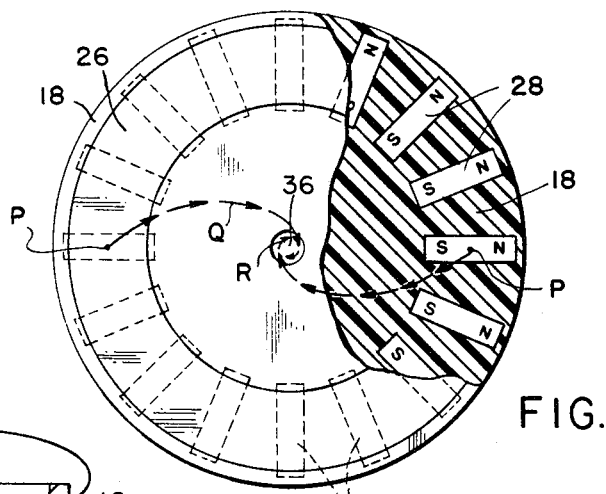
Figure 3:
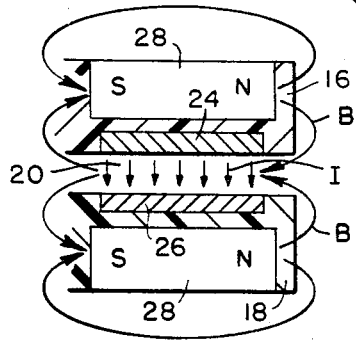

Other object and many of the attendant advantages of this invention will be readily appreciated as the same becomes better understood by reference to the following detailed description when considered in connection with the accompanying drawings wherein:

FIG. 1 is a central section through apparatus forming the subject of the invention, FIG. 2 is a view, partially cut away, taken along line 2—2 of FIG. 1; and FIG. 3 is a detail of FIG. 1, indicated by arrow 3, FIG. 1, and further diagrammatically showing magnetic force line vectors and current flow vectors.

Referring now to the drawing and in particular to FIG. 1, an electrical to fluid signal converter 10 is formed as a built-up construction of concentric molded plastic parts including housing sections 12 and 14, and internally disposed members 16 and 18. Sections 12 and 14 form the upper and lower halves of a housing and include laterally extending rim portions 12a and 14a which form the closure wall about the circumference of converter 10. Members 16 and 18 are mounted in the cavity formed within and by the housing, with their confronting faces spaced apart by a small axial gap, so that a thin disc-shaped circular chamber or cavity 20 is formed therebetween. Member 16 is supported from upper housing section 12 by means of spacer struts 22, and member 18 is seated directly on the flat surface formed by the inner wall of lower housing section 14. The confronting faces of members 16 and 18 contain integrally molded electrode rings 24 and 26, which are disposed adjacent the outer periphery of the members and in opposed relationship to one another. Rings 24 and 26 are preferably made of platinum. Behind the electrode rings, each member also contains a circular row of angularly spaced bar magnets 28 with their respective north pole faces disposed in the radially outward direction. The magnets 28 are preferably of a type providing a very high degree of magnetic remanence, such as the commercially available types made of alnico V or alnico VDG. A central inlet opening 30 is formed on the top wall of upper housing section 12. Opening 30 leads into a circular cavity 32 defined between upper housing section 12 and member 16, as the result of mounting member 16 by means of spacer struts 22. An annular cavity 34 is defined between the lateral wall of the housing and the peripheral edge of members 16 and 18, and this cavity serves to communicate the outer peripheries of circular cavities 20 and 32. A central outlet opening 36 is formed in member 18 and communicates with the bottom face of lower housing section 14.

Normally saline ocean water, under feed pressure, is supplied to inlet 30 from any suitable source. In the case of the use of converter 10 in a torpedo, as alluded to in the preamble to this specification, the source may conveniently comprise seawater from a ram intake located in the torpedo body. Leads 38 and 40, which are connected to electrode rings 24 and 26, complete a circuit to an electrical signal source 42 for applying a signal potential across the electrodes. In the aforementioned case of the use of converter 10 in a torpedo, the signal source may be the torpedo's acoustic detection apparatus. Outlet port 36 is connected to the input of a conventional vortex flow to differential pressure fluid signal converter unit 44. Vortex to differential pressure unit 44 converts a fluid signal, represented by a vortex stream which may vary in direction of flow between either of opposite angular directions about the vortex axis and which may vary in vortex stream intensity, to an ordinary dynamic pressure differential between a pair of output conduits 46. Such transducers, which find use in the prior art in connection with fluid gyroscopes, are commercially available from a variety of sources including Bowles Engineering Corp., Silver Spring, Md., and Minneapolis-Honeywell Co., Minneapolis, Minn. Transduer 44 also has a vent outlet 48.

In operation, the seawater from the pressurized source enters through inlet 30 and is diffused and decelerated in its radially outward flow through cavity 32. From cavity 32 the seawater fills the annular cavity 34 communicating with the outer periphery of thin disc-shaped cavity 20, the annular cavity 34 serving as a supply zone from which the seawater enters cavity 20. From the outer periphery of cavity 20 the seawater flows radially inwardly to outlet 36 at the cavity's center. As best shown in FIG. 3, the magnetic field B produced by the rows of magnets 28 has a radially inwardly pointing magnetic force line component passing through the flow of seawater between electrodes 24 and 26. The potential applied across electrodes 24 and 26, by signal source 42, causes a current flow I in the electrically conductive seawater between same. For purposes of illustration, it is assumed that the upper electrode 24 is more positive than the lower electrode 26, producing a current flow from the former to the latter as indicated on the drawing. In accordance with well known principles of magnetohydrodynamic forces, the mutually perpendicular magnetic force line field B, and field of electric current flow I in the annular region between electrodes 24 and 26, exerts a clockwise circumferential force on the seawater particles flowing through this annular region. Thus elemental seawater particles, symbolically represented by points P, FIG. 2, experience a finite clockwise acceleration, causing them to follow a spiral path. In flowing radially inwardly through cavity 20 to central outlet 36, the seawater undergoes acceleration in the radially inward direction, as the result of the decreasing cross sectional areas which disc-shaped cavity 20 presents to the inward flow. The increase of the radial component of acceleration causes the particle to follow a spiral track Q having increasing curvature. This effectively amplifies the original clockwise acceleration which the particle experienced in response to the cross magnetic and current fields, and causes the seawater to enter the central outlet 36 as a stable well defined stream of vortex flow having an angular flow direction and intensity determined by the polarity and magnitude of electrical signal applied across electrodes 24 and 26. Within the uniform diametered outlet passage 36, the vortex stream flows along as a clockwise whirl pattern R. Transducer 44 converts this vortex motion into a differential pressure signal across its output conduits 46.

While the apparatus has been described for use in modulating a stream of seawater, it will be apparent that it may be employed for modulating any conductive fluids where sensitive response to changes in the input signal is desired.

Obviously many modifications and variations of the present invention are possible in the light of the above teachings. It is therefore to be understood that within the scope of the appended claims the invention may be practiced otherwise than as specifically described.

What is claimed is:

1. A transducer for converting a variable electrical input signal of the type which may vary between opposite polarities and in amplitude to a variable vortex stream in a flow of an electrically conductive fluid medium under predetermined feed pressure, comprising;
   (a) a housing,
   (b) a first thin, disc-shaped, chamber formed in said housing,
   (c) a circumferentially continuous inlet opening into said first chamber along its entire periphery to admit said fluid under said predetermined feed pressure into said first chamber,
   (d) a centrally disposed vortex stream outlet opening formed in one of the opposite wall faces of the first chamber,
   (e) first and second opposed electrode rings of nonmagnetic material disposed in one and the other of opposite radial walls of the first chamber adjacent to its outer periphery, and adapted to receive said input signal thereacross to cause an electric current flow across the chamber through the electrically conductive fluid between the opposed rings, and
   (f) means for generating a substantially concentric magnetic flux field adjacent the electrode rings, said concentric flux field providing component magnetic force lines passing through the electrically conductive fluid between the electrode rings in radial directions with a predetermined force line polarity, to co-act with the current flow to impart to the fluid between the rings one or the other angular directions of spiral movement at an intensity of spiral movement in accordance with the polarity and amplitude of the input signal.

2. Apparatus in accordance with claim 1, wherein
   (g) said means for generating said flux field comprises a plurality of angularly arranged bar magnets behind the electrode rings disposed in each radial wall of the first chamber, said bar magnets having their north and south pole faces disposed in a common radial orientation to generate a pair of torodial field pattterns, each of which provide component magnetic force lines through the space between the opposed rings.

3. Apparatus in accordance with claim 2, and (h) a second axial disc-shaped chamber in said housing and having a central opening for receiving said conductive fluid from a pressurized source, said second disc-shaped chamber being disposed to the axial side of said first chamber which is opposite to the side having said central outlet opening, and (i) an annular conduit communicating the periphery of the second chamber and the periphery of the first chamber to form a conductive fluid supply zone from which the fluid flows into said inlet opening of said first chamber.

4. In a transducer for converting a variable electrical input signal of the type which may vary between opposite polarities and in amplitude to a variable vortex stream signal in a flow of an electrically conductive fluid under predetermined feed pressure, (a) a thin disc-shaped passage for radial flow therethrough and means for delivering said conductive fluid at constant pressure to the entire periphery of said passage for radially inward flow therethrough, (b) means for generating crossed fields, of magnetic flux lines and current flow, through the conductive fluid during its flow through an outer annular portion of said passage to impart spiral motion thereto of an angular direction and amplitude in accordance with the polarity and amplitude of electrical signal, and (c) the inner annular portion of said passage adapted to increase the velocity of the flow and amplify the spiral movement, and (d) a central discharge conduit for moving the vortex stream in a direction perpendicular to the disc-shaped passage in communication with a vortex flow signal to differential pressure fluid signal transducer.

References Cited
UNITED STATES PATENTS

| | | | |
|---|---|---|---|
| 2,652,778 | 9/1953 | Crever | 103—1 |
| 2,763,125 | 9/1956 | Kadosch et al. | 137—81.5 X |
| 2,997,013 | 8/1961 | Rice | 60—202 |
| 3,071,154 | 1/1963 | Cargill et al. | 137—81.5 |
| 3,072,807 | 1/1963 | Stedman | 73—516 X |
| 3,138,919 | 6/1964 | Deutsch | 103—1 |
| 3,176,520 | 4/1965 | Aske | 73—516 |
| 3,182,675 | 5/1965 | Zilberfarb et al. | 137—815 |
| 3,257,949 | 6/1966 | Mead | 103—1 |
| 3,270,672 | 9/1966 | Haines et al. | 103—1 |
| 3,273,594 | 9/1966 | Mayer | 137—85.1 X |

SAMUEL SCOTT, *Primary Examiner.*